Figure 3:
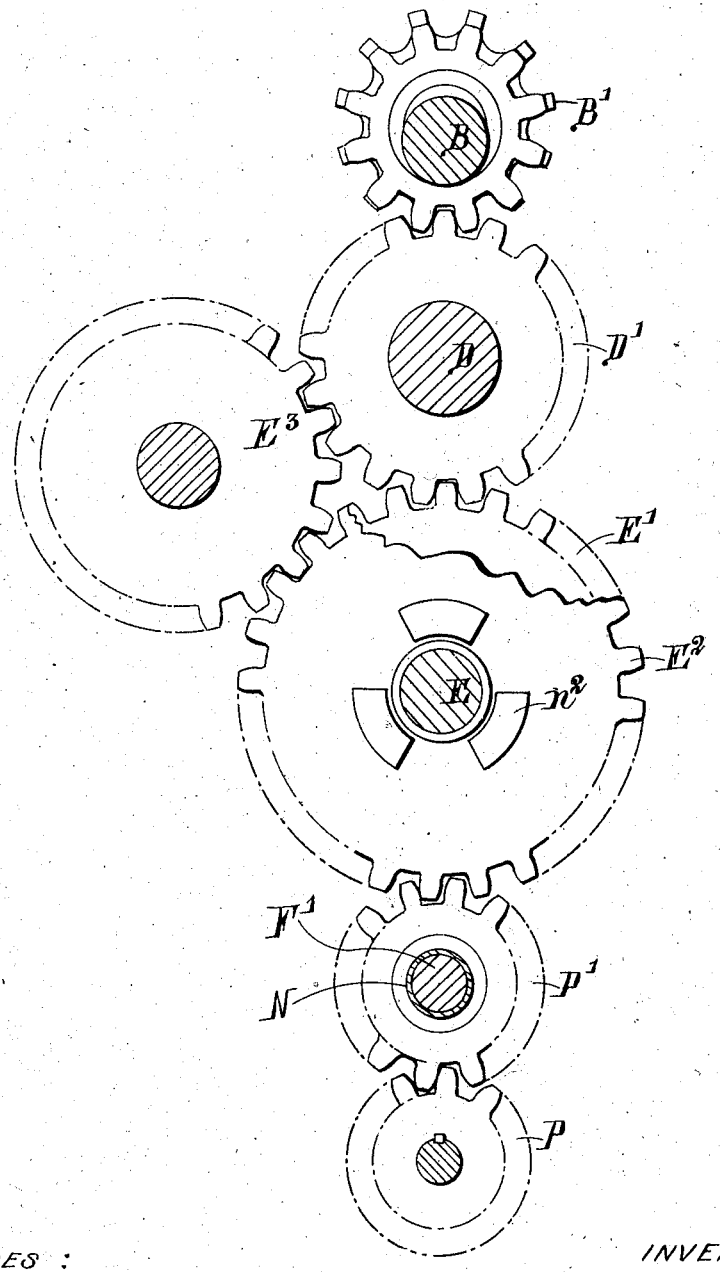

No. 833,974. PATENTED OCT. 23, 1906.
R. M. RUCK.
VARIABLE SPEED DRIVING MECHANISM.
APPLICATION FILED APR. 9, 1906.
2 SHEETS—SHEET 1.
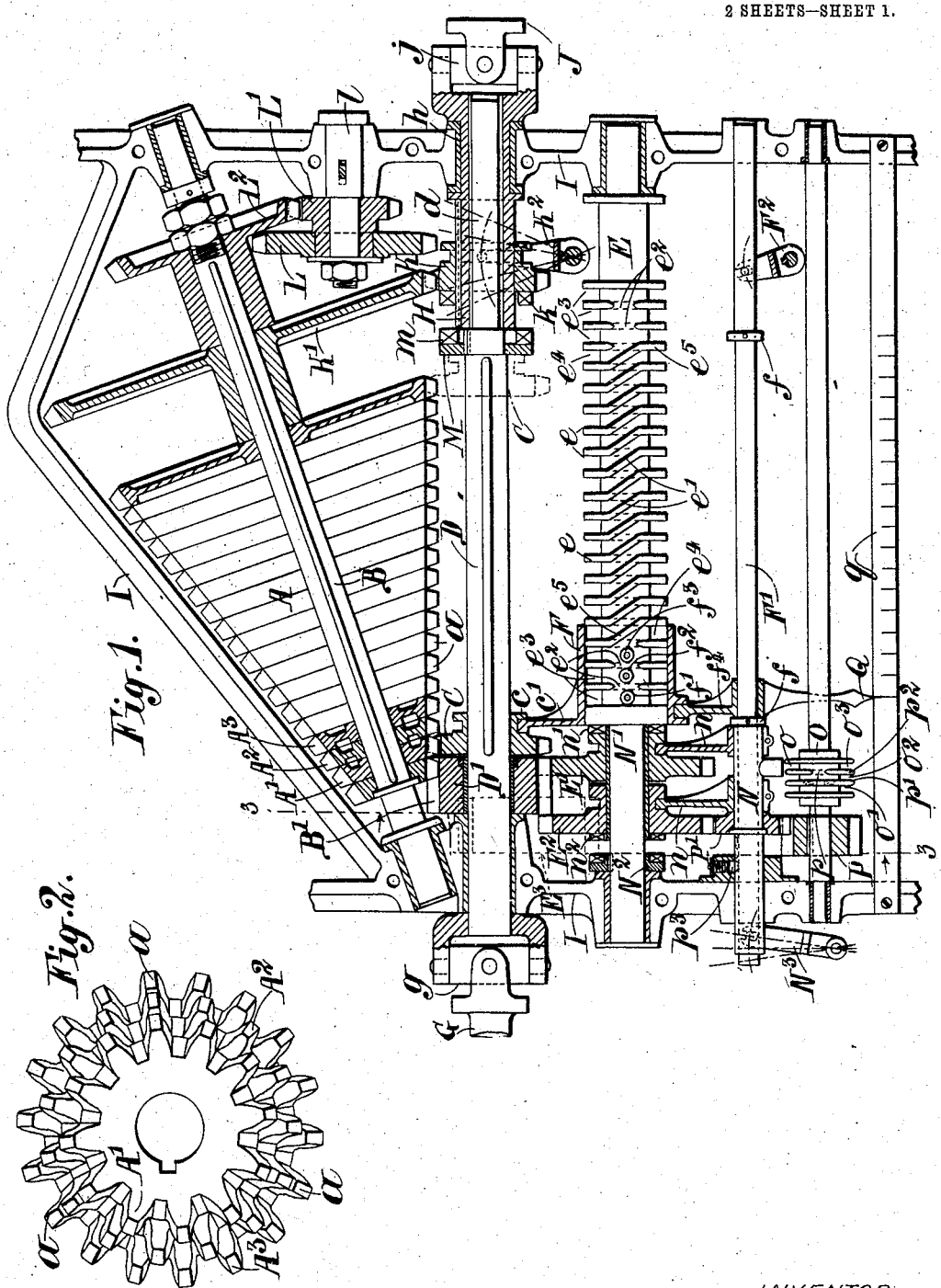
WITNESSES:
W. M. Avery
A. H. Davis
INVENTOR
Richard M. Ruck
BY Munn & Co.
ATTORNEYS No. 833,974. PATENTED OCT. 23, 1906.
R. M. RUCK.
VARIABLE SPEED DRIVING MECHANISM.
APPLICATION FILED APR. 9, 1906.

2 SHEETS—SHEET 2.

WITNESSES:
W. M. Avery
A. H. C. Davis

INVENTOR
Richard M. Ruck
BY Munn & Co
ATTORNEYS

UNITED STATES PATENT OFFICE.

RICHARD MATTHEWS RUCK, OF LONDON, ENGLAND.

VARIABLE-SPEED DRIVING MECHANISM.

No. 833,974.  Specification of Letters Patent.  Patented Oct. 23, 1906.

Application filed April 9, 1906. Serial No. 310,696.

*To all whom it may concern:*

Be it known that I, RICHARD MATTHEWS RUCK, a subject of the King of Great Britain, and a resident of 44 Thurloe Square, South Kensington, London, England, have invented certain new and useful Improvements in Variable-Speed Driving Mechanism, of which the following is a specification.

This invention relates to variable-speed driving mechanism, more particularly such as is used in the transmission of power from high-speed motors; and it has for its object to provide apparatus of the kind referred to which shall combine the advantages (with regard to positive driving and graduated alteration of speed ratio) and avoid the disadvantages (with regard to shock and slip) incidental to the use of toothed-wheel gearing and of conoidal friction-pulley variable-speed mechanism, respectively.

The invention will be described with reference to the accompanying drawings, wherein—

Figure 1 represents in sectional plan a form of the improved driving-gear designed specially for use on motor-cars. Fig. 2 is a partial end view of a so-called "toothed cone." Fig. 3 is a part section of the apparatus on line 3 3 of Fig. 1, the same being shown to larger scale.

According to the present invention, one member of the variable-speed mechanism consists of a series ($A'$ $A^2$ $A^3$, &c.) of rings of bevel-teeth fixed side by side upon a shaft B, successive rings having progressively-varying numbers of teeth of equal pitch and the diameters of successive rings $A'$ $A^2$ $A^3$, &c., varying progressively in such ratio that the series of rings together constitute what may be termed a "toothed" cone A, wherein successive rings have the pitch-cone of their teeth coincident with successive zones of a single cone, constituting what may be termed the "pitch-surface" of the so-called "toothed" cone A. The other member of the variable-speed mechanism consists of a toothed pinion C, having teeth adapted to gear with those of the so-called "cone," this pinion being splined upon a shaft D, which lies in the same plane with the shaft B of the cone, parallel to the pitch-surface of the latter and at such a distance therefrom that the pinion by being moved in the direction of its own axis may be brought successively into gear with all the rings of teeth constituting the cone. Hence motion may be transmitted between the members A and C of the variable-speed mechanism in any speed ratio corresponding to the ratio between the number of teeth in the pinion C and the number in any one of the rings of teeth constituting the cone A, according to the position for the time being of the pinion lengthwise of the cone.

In order that the pinion C may be so moved along its shaft D as to be brought into gear with successive rings of teeth on the cone while both members A and C of the gear are rotating, the rings of teeth constituting the cone are arranged in such angular relation to one another about their common axis that, as indicated in Fig. 2, all the rings have one tooth $a$ (or space between two adjacent teeth) alined in a row which lies in one plane passing through the axis of the cone, so that when during the revolution of the cone said plane coincides with the plane wherein the axes of the cone A and pinion C both lie the pinion may without shock be moved out of gear with that ring of teeth with which it is then in engagement and into gear with either of the rings adjacent to said ring. The arrangement thus permits of the pinion being momentarily in gear with two adjacent rings of teeth at one and the same time instead of necessitating the pinion being thrown entirely out of gear with one ring before being thrown into gear with another. Hence successive rings of teeth may be closely juxtaposed, as shown, and the movement whereby the pinion is shifted lengthwise of the cone in order to alter the ratio of the gearing, although in reality intermittent, has almost the smooth character proper to unbroken continuity.

A single step of the pinion C lengthwise of the cone would usually (and especially where the speed of rotation is high) be as much as could be accomplished during a single revolution of the cone; but where, as in the cone shown in Fig. 2, there are, say, three equidistant points in the circumference of the cone whereat all the rings $A'$ $A^2$ $A^3$, &c., of teeth have a tooth $a$ lying in the same plane, a step in either direction may be performed by the pinion C each time one of said three rows of alined teeth $a$ comes into the common plane of the shafts B and D. In any case means are provided whereby a step-by-step movement in either direction longitudinally of its own axis to an extent corresponding (in the case of each step) to the breadth of one ring of teeth may be communicated to the pinion when it is required to alter the ratio of the gearing. In the arrangement shown such movement of the pinion C is (under manual control) automatically effected, for which purpose a screw-shaft E is mounted in bearings parallel to the axis of the shaft D and fitted with a nut F, which is prevented from turning and is provided with an arm $c$, adapted to engage between collars $c$ on the boss of the pinion, so that movement of the nut lengthwise of the screw-shaft E will be communicated to the pinion. The screw-shaft E is adapted when revolved to communicate to the nut F once during a portion of each revolution longitudinal movement to an extent corresponding to the breadth of one ring of teeth of the cone A, and means are provided whereby when it is desired to vary the ratio between the two members of the gear the screw-shaft E may be caused to rotate in time with the revolution of the cone A in a direction to propel the nut F toward that point in its travel corresponding to that ring of teeth with which the pinion C must be brought into gear in order to effect the necessary alteration in speed ratio, said means being also adapted to enable the nut F to be arrested when the pinion C has been brought into gear with the required ring of teeth. To these ends the screw-shaft E has a thread which throughout the greater part of each convolution lies, as at $e$, in one plane perpendicular to the axis of the screw, the oblique (or movement-producing) part $e'$ of the convolution occupying a relatively small portion of the circumference, so that the screw, although revolved continuously, will transmit motion to the nut F only intermittently—that is to say, during that part of each revolution which corresponds to the angular amplitude of each part $e'$ of the thread. All the inclined (or movement-producing) parts $e'$ of successive convolutions of the thread occupy the same angular position about the axis of the screw-shaft E, so that the nut F receives its intermittent movement always at the same point in the rotation of the screw, which point is arranged to occur simultaneously with the moment of coincidence between that axial plane of the cone A wherein lie the teeth $a$ of each ring of teeth and the common plane of the shafts B and D.

The nut F may have in place of the usual internal thread a stud adapted to engage between adjacent threads of the screw E or a row, as $f'$ $f^2$ $f^3$, of such studs in alinement with one another lengthwise of the screw, as shown. In such case the inclined (or movement-producing) parts of the convolutions are omitted, as at $e^2$, between the terminal grooves $e^3$, wherein the studs $f'$ $f^2$ $f^3$ engage when the nut F is at either end of its travel and also between the innermost of said terminal grooves $e^3$ and that groove $e^4$ of the screw which is adjacent to the first movement-producing convolution $e^5$ of the screw-thread, so that the nut F when brought to either end of its travel will remain stationary notwithstanding continued rotation of the screw-shaft, but will nevertheless be free to be moved in the reverse direction when required.

For the purpose of starting the nut on its travel from either end a rod F' is mounted to slide in guides parallel to the axis of the screw-shaft E, so as to be capable of participating to a limited extent in the travel of the nut, the rod F' carrying two collars $f$, so placed as to be respectively encountered by an arm $f^4$ on the nut when the latter completes the last step of its travel in either direction. The rod F' has therefore a stroke equal to the length of one step of the nut F and when at either limit of its movement is adapted to receive from the hand of the person controlling the apparatus—as, for example, through a rock-shaft and forked lever, as at F²—momentary pressure in a longitudinal direction sufficient to cause that one of the studs $f'$ $f^2$ $f^3$ which for the time being is innermost to pass from that terminal groove $e^3$ wherein it has been stationary to the next groove $e^4$ at the moment when the gap $e^2$ in the corresponding thread is brought by the revolution of the screw-shaft opposite to the stud. When the stud in question has passed into the groove $e^4$, the revolution of the screw-shaft E in the corresponding direction will cause the nut to automatically continue its travel as far as the opposite end of the threaded portion of the screw-shaft or until the rotation of said shaft is arrested, as hereinafter described.

The ratio between the diameters of the respective members A and C of the variable-speed gear may be made to suit the circumstances of each case, and either of said members may be the driving member. In the example illustrated the cone A is the driving member and the pinion C the driven member, while equality of ratio is the lowest gear used and is therefore that at which the heaviest work can be performed. The shaft D, upon which the pinion C is splined, is coupled at one end to the usual Cardan shaft G by means of the universal joint $g$ and is journaled at the opposite end $d$ in a tubular shaft or sleeve H, which is driven through the universal joint $j$ from the high-speed-motor shaft J, the sleeve H being in turn journaled in the framing I of the apparatus, as shown at $h$.

In normal forward running the cone-shaft B is driven from the high-speed sleeve H, but at slower speed, by means of a toothed pinion K, splined on the sleeve and in gear with a larger toothed wheel K', fast on the cone-shaft. For backward running the pinion K is slid along the sleeve H—as, for example, by means of a rock-shaft and forked lever, as at K²—so as to be thrown out of gear with wheel K' and into gear with an idle wheel L, turning (upon a stud $l$) as one with a pinion L', which is constantly in gear with a wheel L², fast on the cone-shaft B. When the pinion K is in a position midway between the wheels K' and L, the cone-shaft receives no motion from the sleeve H. Provision is also made for driving the shaft D (and consequently also the Cardan shaft G) direct from and at the same speed as the sleeve H without the interposition of the cone A and pinion C, (which then rotate idly,) for which purpose the pinion K is provided with clutch-teeth $k$, adapted to engage with the teeth $m$ of a clutch member M, fast on the shaft D beyond the end of the sleeve H, so that by sliding the pinion K far enough in the corresponding direction sleeve H and shaft D will be coupled together.

The rotation of the screw-shaft E in the one or the other direction, as required, is effected from the cone-shaft B by means of a toothed pinion B', fast on the latter and constantly connected, through the medium of an idle wheel D', running loose on the shaft D, with wheels E' and E², running loose on the screw-shaft E, the wheel E' gearing directly with wheel D', so as to be rotated in one direction, while the wheel E² is rotated through an intermediate wheel E³ (indicated by dotted lines) in the opposite direction to wheel E'. The wheels E' E² are also slidable upon the screw-shaft E and provided with clutch-teeth $n'$ $n^2$, respectively adapted to be engaged with clutch members N' N², fast on said shaft, the wheels being movable lengthwise of the shaft by means of clutch-forks $n$, attached to a sleeve N, slidable upon the rod F' and adapted to be actuated by hand from any convenient point—as, for example, through a rock-shaft and forked lever, as at N³.

It is obvious that the rotation of the screw-shaft E must be started and stopped only at such times as will cause or permit the longitudinal movement of the nut F to concur with the coming of a row of alined teeth $a$ in all the rings A' A² A³, &c., into the common plane of the shafts B and D. To insure this, the wheels B', D', E', E², and E³ are geared together in such a ratio relatively to the number of teeth in the clutch members N' N² that the throwing of the clutch-teeth $n'$ or $n^2$ into gear with the clutch member N' or N² can only take place at a proper moment for starting the rotation of the screw-shaft E, while means are further provided for insuring that such rotation when once commenced shall not be arrested until the pinion C has been carried the exact distance corresponding to the pitch apart of the toothed rings A' A² A³, &c., or, in other words, until the pinion C has been moved clear of one ring of teeth and into full gear with the next ring. For this purpose the sleeve N is provided with a stud $e$, which projects so as to intermesh alternatively with one or other of a series of three peripheral grooves $o'$ $o^2$ $o^3$ on a barrel O, rotating on an axis parallel to that of the sleeve. The grooves $o'$ $o^2$ $o^3$, which are the same distance apart as are the three positions of the sleeve N, are separated by collars $p'$ $p^2$, each of which has a gap $p$ for the passage of the stud $o$, and the barrel O is constantly rotated—as, for example, by a wheel P, fast on the barrel and gearing with an idle wheel P', running loose on the sleeve N and driven by the wheel E²—at a speed ratio relatively to the speed of rotation of the wheels E' E² such that the stud $o$ can only pass through a gap $p$ from either of the extreme grooves $o'$ $o^3$ into the middle groove $o^2$ at the proper moment for stopping the rotation of the screw-shaft E. The two gaps $p$ are situated at opposite ends of a diameter of the barrel O, so that the sleeve N can only be shifted at one time a distance equal to that between the groove $o^2$ and one or other of the grooves $o'$ $o^3$. As a further means of insuring the completion when once begun of the clutching or unclutching movement of the wheels E' E² the stud $o$ is made of cylindrical or rounded form and the collars $p'$ $p^2$ at the sides of each gap $p$ are formed with a sharp or wedge-shaped edge, as indicated, while as an additional precaution the sleeve N may be engaged at each of its three positions by a spring-jumper $p^3$ or equivalent device.

Q is an index or pointer movable as one with the nut F, so as by exhibiting the position of the latter relatively to a fixed scale $q$ to show the position of the pinion C lengthwise of the cone A, and consequently the exact speed ratio at which the gear is at any moment running.

I claim—

1. The improved variable-speed mechanism formed by the combination with a shaft B of a toothed conoidal drum composed of a series of bevel-gears A', A², &c., juxtaposed and fast on said shaft and having progressively-varying numbers of teeth which are of equal pitch, the adjacent teeth of the several gears being alined so as to form a row lying in the same plane with the axis of shaft B, a second shaft D inclined to the first-named shaft B, but in the same plane therewith, a pinion keyed to, but mounted slidably on, said shaft D and arranged in a plane inclined to the planes of all the bevel-gears of the conoidal drum, substantially as described.

2. Variable-speed driving mechanism, consisting in the combination of a so-called toothed cone constituted by a series of juxtaposed rings of bevel-teeth of equal pitch mounted to turn as one about a common axis, the number of teeth in successive rings varying progressively in such ratio that the pitch-cones of successive rings coincide with successive zones of a single cone constituting the pitch-surface of the so-called toothed cone and one tooth of all the rings being alined to form a row lying in one plane passing through said axis; a shaft journaled to rotate in bearings in the same plane with the axis and parallel to the bounding-surface of the cone; a toothed pinion splined upon said shaft and adapted to gear with the several toothed rings of the cone alternatively; a screw journaled in bearings parallel to said shaft and having a thread whose pitch corresponds to the distance apart of the toothed rings of the cone, and each of whose convolutions, for the greater portion of its circumference, lies in a plane perpendicular to the axis of the screw; there being gaps in the terminal convolutions of the screw-thread; a nut adapted to work upon and held against rotation relatively to said screw and so coupled to said pinion as to be capable of communicating thereto its own traversing movement lengthwise of the screw; gearing for rotating the screw in either direction alternatively and at such speed relatively to that of the toothed cone that the nut may receive traversing movement along the screw in the corresponding direction step by step at those moments only when the row of alined teeth in all the rings of the cone are brought into the common plane of the axes of the cone and shaft; and means whereby, when the nut is not being thus traversed along the screw, the rotation of the latter may be started in either direction and stopped independently of the revolution of the cone and shaft, substantially as specified.

RICHARD MATTHEWS RUCK.

Witnesses:
GEORGE ERNEST MINTERN,
WALTER J. SKERTEN.